United States Patent

Buller et al.

[15] 3,662,106

[45] May 9, 1917

[54] OPTICAL MULTIPLEXING DEVICE AND SYSTEM FOR TELEVISION TRANSMITTERS

[72] Inventors: Dale F. Buller, Liverpool; Douglas W. Rohrs, Baldwinsville, both of N.Y.

[73] Assignee: General Electric Company

[22] Filed: Mar. 24, 1969

[21] Appl. No.: 809,514

[52] U.S. Cl. ..........................178/7.88, 178/DIG. 6, 350/171

[51] Int. Cl. ..........................H04n 5/24

[58] Field of Search ..........................178/7.85, 7.88, 7.89, 7.91, 178/7.92, 7.2, DIG. 6; 300/169, 171, 172, 174, 288

[56] References Cited

UNITED STATES PATENTS

| | | | |
|---|---|---|---|
| 2,854,901 | 10/1958 | Fathauer | 178/7.92 |
| 3,104,283 | 9/1963 | Moller | 178/7.85 |
| 3,510,657 | 5/1970 | Mangiaracina | 178/7.2 |

OTHER PUBLICATIONS

Jones, Mullinger, Multiplexing Film Cameras to Minimize TV Program Failures, Tele–Tech, Nov. 1949 pp. 34, 35

An Optical System Employing A Beam Splitting or Combining Arrangement, Electronic Engineering, Nov. 1964, pp. 769

Mayers, Chipp, Closed Circuit TV System Planning, 1957, pp. 174– 176

Gray TV Broadcasting Equipment Publication

Snow–Local TV Commercials FM & Television pp. 22, 23

Lind et al. Optical Multiplexing in Television Film Equipment Jour. of SMPTE Vol. 65 Mar. 1956, pp. 140– 143.

*Primary Examiner*—Benedict V. Safourek

*Assistant Examiner*—Joseph A. Orsino, Jr.

*Attorney*—Michael Masnik, Frank L. Neuhauser, James J. Williams, Oscar B. Waddell and Joseph B. Forman

[57] ABSTRACT

A device and system for establishing two alternative optical paths between each of four image sources and two discrete color television cameras. This system provides eight identical optical path lengths. It also includes a multiplexing device which comprises a hexagonally configured housing wherein there are arranged eight slidably movable mirrors. Each of these mirrors is of the first surface type, having a reflective surface disposed in one of the optical paths.

11 Claims, 2 Drawing Figures

INVENTORS:
DALE F. BULLER,
DOUGLAS W. ROHRS,
BY Thomas A. Briody
THEIR ATTORNEY.

OPTICAL MULTIPLEXING DEVICE AND SYSTEM FOR TELEVISION TRANSMITTERS

BACKGROUND OF THE INVENTION

1. Field of the Invention

This invention relates to an optical multiplexing device and a system for switching several image inputs into one or two outputs.

2. Description of the Prior Art

U.S. Pat. No. 3,104,283 (Moller) discloses an optical multiplexing device wherein one of a plurality of possible optical paths is established from one of a like plurality of image sources such as film or slide projectors, to a single television camera. The system of the Moller patent lacks the flexibility which might be afforded by providing selective access of the various image sources to two separate and distinct color television cameras. It has also been previously known to provide a multiplexing device for selectively establishing optical paths from three different image outputs to two television camera inputs. However, this other prior art approach is limited to a single color television output and a black and white television output, and also presents a small optical path error between two of its inputs and its black and white television output.

SUMMARY OF THE INVENTION

Prior art optical multiplexers have failed to provide an efficient optical multiplexing system which comprises four inputs, two outputs, and eight optical paths each of which has an identical path length. Optical multiplexing systems, heretofore, have also failed to achieve an effective technique for the concurrent assignment of any one of four image inputs to optically communicate with a color television camera output while any one of the other inputs is assigned to a second color television camera output. Accordingly, it is an important object of this invention to provide a new and improved optical multiplexer device which includes four inputs, two outputs, and eight optical paths arranged in such a manner as to provide identical path lengths. Another significant object of the present invention is to provide a multiplexing device and system which readily lends itself to the concurrent assignment of any one of four image inputs to one color television camera while one of the other inputs is assigned to a second color television camera. A further object of this invention is to provide an improved optical multiplexing device for use with two outputs and four inputs, which comprises eight first surface mirrors arranged to provide single image reversal and eight identical optical path lengths.

In the disclosed embodiment of the present invention there is provided an optical multiplexing system wherein first and second color television cameras are relatively disposed radially from the vertical axis of an optical multiplexing device, in an offset and generally facing relationship with respect to each other. The main optical axes of these cameras are disposed in parallel and spaced apart relationship. A series of four image sources are radially clustered about the multiplexing device and disposed with respect to the first and second cameras so that there are two image sources located on opposite sides of and adjacent to the first camera, and two other image sources located on opposite sides and adjacent to the second camera. With this arrangement, and in accordance with the present invention the optical multiplexing device includes a series of eight first surface mirrors. These mirrors are disposed in a hexagonally configured housing so that a reflective surface of each of the mirrors forms part of an optical path between one of the image sources and one of the output cameras. The optical axes of the two cameras and the four image sources are all located in the same plane and spaced apart from each other by an angle of 60°. The mirrors are arranged in the multiplexing device so that any image source of the system may have an optical path from its optical axis to one or the other of two associated mirrors, and then from said mirror to an associated one of the first and second cameras. If any one of the image sources is actively assigned to one color television camera, any of the other three image sources may have an optical path to one or the other of two associated mirrors, and from there to the other one of the color television cameras. Such an optical multiplexing arrangement has been found to operate most effectively and readily lends itself to simplified operation with two color television cameras.

DESCRIPTION OF THE PREFERRED EMBODIMENT

Figure 1:
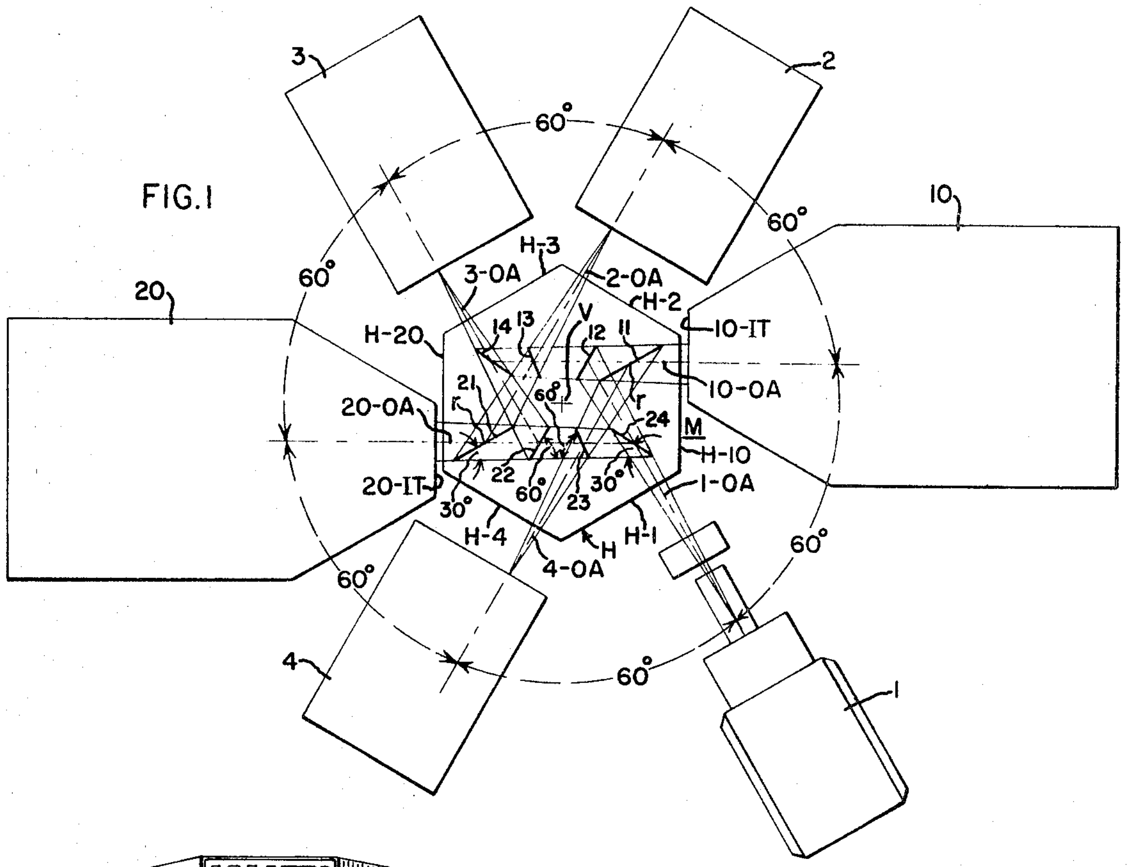
FIG. 1 is a schematic diagram of an optical multiplexing system in accordance with one form of the present invention.

As shown schematically in FIG. 1, the present invention provides an optical multiplexing system for selection of eight optical paths proceeding from projectors 1, 2, 3, and 4 to two color television cameras 10 and 20.

Of the illustrated projectors 1, 2, 3, and 4, projector 1 is a slide projector, and projectors 2, 3, and 4 are 16 mm film projectors. However, it also is within the purview of this invention to replace slide projector 1 with a film projector, and to thus provide all four inputs from film projectors.

Figure 2:
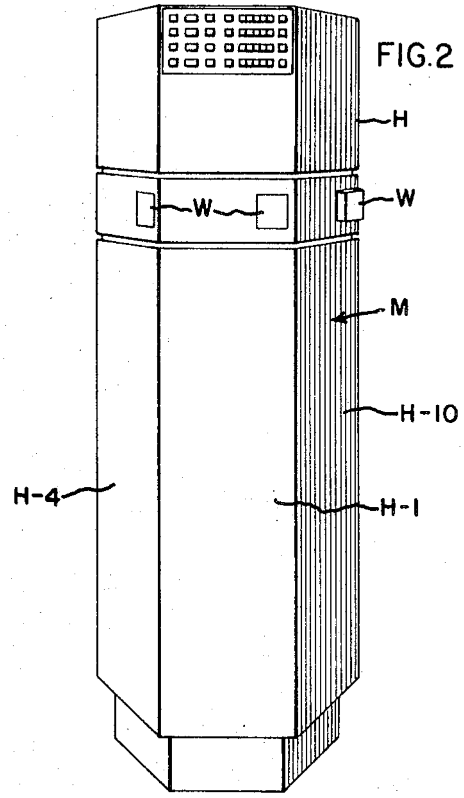
FIG. 2 is a front elevation view of an optical multiplexing device constructed in accordance with our invention.

The optical axis 10-OA of color television camera 10 is disposed in parallel relationship to the optical axis 20-OA of color television camera 20, and the input targets of these cameras are disposed at forward ends 10-IT and 20-IT of the cameras, in generally opposite, but slightly offset relationship. Between the input targets of the color television cameras 10 and 20, there is positioned a multiplexing device M (FIG. 2) which includes a housing H. The housing H has the shape of a regular hexahedron, and includes six elongated equilateral sides, H-1, H-2, H-3, H-4, H-10 and H-20. As further shown in FIG. 1, the hexagonally arranged sides H-1 and H-3 are disposed opposite to each other and extend upwardly, to the right. The hexagonal sides H-2 and H-4 (viewing FIG. 1) of the housing H are also disposed opposite to each other and extend upwardly, to the left. The hexagonal sides H-10 and H-20 of the housing H are disposed opposite to each other, and extend vertically, viewing FIG. 1.

The input target of camera 10, is disposed at forward end 10-IT thereof, in parallel spaced apart contiguity with respect to side H-10 of housing H of the multiplexing device M. The input target of the camera 20 is disposed at forward end 20-IT thereof, in parallel, spaced apart contiguity with respect to side H-20 of housing H of the multiplexing device M.

The slide gate of projector 1, which is disposed on the front wall of slide projector 1, is located in spaced apart parallel relationship with respect to side H-1 of housing H of the multiplexing device M. The film gate of projector 2, disposed on the front wall of projector 2, is located in parallel, spaced apart relationship with respect to side H-2 of housing H of the multiplexing device M. The film gate of projector 3, also disposed on the front wall of this projector, is located in spaced apart, parallel relationship with respect to side H-3 of the hexagonal housing H. The film gate of projector 4, likewise located on the front wall of projector 4, is disposed in spaced apart and parallel relationship with respect to side H-4 of housing H of the optical multiplexing device M.

As further shown in FIG. 1, the projector 3 is located upwardly and alongside of camera 20 so that the optical axis 3-OA of projector 3 is situated at an included clockwise acute angle of 60° with respect to the optical axis 20-OA of color camera 20. The projector 2 is located upwardly and alongside of camera 10 and projector 3, so that optical axis 2-OA of projector 2 is situated at angles of 60° from optical axes 10-OA and 3-OA. Projector 1 is located downwardly and alongside of camera 10 so that the optical axis of 1-OA of projector 1, is situated at an included clockwise acute angle of 60° with respect to the optical axis 10-OA of color camera 10. Projector 4 is located downwardly alongside of projector 1 and camera 20 so that optical axis 4-OA of projector 4 is situated at angles of 60° from the optical axes 1-OA and 20-OA.

All of the optical axes 10-OA, 20-OA, 1-OA, 2-OA, 3-OA, and 4-OA are located in a single plane, which is perpendicular to the vertical (central) axis of the hexagonal housing H of the optical multiplexing device M.

Turning now to the arrangement of the mirrors 11 through 14 and 21 through 24 of the optical multiplexing device M, attention is further directed to FIG. 1. As shown therein, the vertical axis or center of each of the mirrors 11, 12, 13 and 14, is in alignment with the optical axis 10-OA of the color camera 10. In addition, the vertical axis or center of each of the mirrors 21, 22, 23, and 24 is in alignment with optical axis 20-OA of color camera 20. It should be understood that each of the mirrors 11 through 14 and 21 through 24 is slidably movable in a vertical direction (viewing FIG. 2) by a conventional mechanism (not shown), so that, at any one time, only one of the mirrors in each row is in operational vertical alignment with the optical axis of an associated color camera.

Each of the mirrors 11, 12, 13, and 14 includes a reflective surface "*r*" which generally faces the input target 10-IT of color television camera 10. Each of the mirrors 21, 22, 23, and 24 includes a reflective surface "*r*" which generally faces the input target 20-IT of color television camera 20.

The reflective surfaces of the mirrors 11 and 21 are disposed in a single plane which includes the vertical axis V of the hexagonal housing H, and extends upwardly, to the right (as shown in FIG. 1) at an acute angle of 30° in relationship to optical axes 10-OA, 20-OA of the color cameras. The reflective surfaces "*r*" of the mirrors 12 and 22 are disposed in a single plane which also includes the vertical axis V of the hexagonal housing H, and extends upwardly, to the right (as shown in FIG. 1) at an acute angle of 60° in relationship to the optical axes 10-OA and 20-OA of the color camera. The reflective surfaces "*r*" of mirrors 13 and 23 are disposed in a single plane which includes the vertical axis V of the hexagonal housing H, and extends upwardly, to the left (as shown in FIG. 1) at an acute angle of 60° in relationship to the optical axes 10-OA and 20-OA of the color cameras. Finally, the reflective surfaces "*r*" of the mirrors 14 and 24 are disposed in a single plane which includes the vertical axis V of the hexagonal housing H, and extends upwardly, to the left (as shown in FIG. 1) at an acute angle of 30° in relationship to the optical axes 10-OA and 20-OA of the color cameras.

Turning now to a description of the operation of the improved optical multiplexing system of the present invention, it is initially noted that the mirrors 11, 12, 13, and 14 and 20, 21, 22, 23 and 24, are each mounted on a carriage (not shown) that moves vertically on dual shafts and is lowered into the light path (i.e. in vertical alignment with the horizontal plane that includes the optical axes of the projectors and cameras) when the mirror is in use. Only one of the mirrors is in front of a camera at any time. The carriage which includes each mirror is normally retained in an upward position, out of alignment with the optical axes by a latch (not shown) which is releasable by a small solenoid. When it is desired to place a mirror in operative position, it is lowered by gravity and after its use it is returned to its upper latched position by its solenoid (also not shown).

It it is desired to use slide projector 1 as an image source for camera 10, the mirror 12 is thereupon lowered (in response to suitable controls) by solenoid action along its vertical axis into a vertical position of horizontal alignment with the optical axis 1-OA of projector 1. The visual output of projector 1 is then communicated along optical axis 1-OA of projector 1 from the film gate of the projector, and is reflected by the reflective surface "*r*" of mirror 12 so that it is effectively focused along the optical axis 10-OA of camera 10 into the input target 10-IT of camera 10. If it is desired to use the output of projector 1 as the image source for camera 20, the mirror 24 is thereupon lowered along its vertical axis into a vertical position of horizontal alignment with the optical axis 1-OA of projector 1. The visual output of projector 1 is communicated along optical axis 1-OA of projector 1 from the film gate of the projector, and is reflected from the reflective surface "*r*" of mirror 24 so that it is focused along the optical axis 20-OA of camera 20 into the input target 20-IT of the camera 20.

In like manner to the mode of operation of the projector 1 for alternative optical communication with color cameras 10 and 20, if it is desired to use projector 2 as an image source for either of these two cameras, mirror 13 or mirror 21 may be lowered to establish respective optical paths either from axis 2-OA, to reflective surface "*r*" of mirror 13, to optical axis 10-OA of camera 10; or from axis 2-OA, to reflective surface "*r*" of mirror 21, to optical axis 20-OA.

In the event that it is desired to use projector 3 as an image source for either of the two cameras 10 and 20, mirror 14 or mirror 22 may be lowered to establish respective optical paths either from axis 3-OA, to reflective surface "*r*" of mirror 14, to optical axis 10-OA of camera 10; or from axis 3-OA to reflective surface "*r*" of mirror 22, to optical axis 20-OA of camera 20.

For using projector 4 as an image source to communicate with either of the two cameras 10 or 20, mirror 11 or mirror 23 may be lowered to establish respective optical paths either from axis 4-OA, to reflective surface "*r*" of mirror 11, to optical axis 10-OA of camera 10; or from axis 4-OA, to reflective surface "*r*" of mirror 23, to optical axis 20-OA.

It will thus be seen that the present invention utilizes the first reflective surface and single reflective surface of eight slidably movable mirrors which are selectively movable in such a fashion as to provide, at any one point in time, the effective utilization of two out of four discrete image sources, in optical communication with two color television cameras. Since only one reflection is required for each of eight optical paths utilized, identical optical path lengths have been provided for each of the eight discrete channels of optical communication. The system of this invention may accomodate any four input combinations of 16 mm film projectors and slide projectors, with two color output cameras. If an input image source of this system is assigned to any one output camera, all of the other inputs are then available to the other output camera.

It is important to note that the hexagonal shape of the housing H for the multiplexing device M of the present invention, readily lends itself to the geometrical arrangement and alignment with four projectors and two color television cameras in a single optical multiplexing device. Thus, it will be noted that the various optical axes of the projectors and color cameras are spaced at 60° apart from the vertical axis V of the cabinet so that they may pass through windows W formed in the sides of the housing H. Each of these axes is located in perpendicular relationship with one of the windows and sides of the housing H. All inputs and outputs of the system embodying the present invention, are thereupon located in perpendicular disposition to the respective sides of the cabinet.

While the present invention has been particularly shown and described with respect to a single system arrangement and device thereof, it will be understood by those skilled in the art that various changes in form and details may be made therein without departing from the spirit and scope of the invention.

We claim:

1. An optical multiplexing system comprising first and second television cameras having their input targets in general opposition and their optical axes disposed in parallel, spaced apart relationship;

said optical axes of said cameras being disposed in a single horizontal plane;

an optical multiplexing device disposed between the input targets of said cameras;

first and second image sources disposed radially outwardly from said multiplexing device and located on opposite sides of and adjacent said first camera;

third and fourth image sources disposed radially outwardly from said multiplexing device and located on opposite sides and adjacent said second camera;

said first and fourth image devices having respective input optical axes which intersect in the region between said camera optical axes;

said second and third image sources having respective input optical axes which intersect in the region between said camera optical axes;

said first, second, third and fourth input optical axes being disposed in said single horizontal plane;

said optical multiplexing device including a first series of four mirrors each having only a single reflective surface generally facing the input target of said first camera;

said optical multiplexing device also including a second series of four mirrors each having only a single reflective surface generally facing the input target of said second camera;

each of said reflective surfaces being substantially fully reflective;

each of the mirrors of said first series having the plane of its reflective surface angularly disposed with respect to the optical axis of said first camera and operable into optical alignment with the optical axis of said first camera and an associated one of said first, second, third or fourth input optical axes, thereby to provide an optical path involving only one mirror reflecting surface between said associated one of said image sources and said first camera;

each of the mirrors of said second series having the plane of its reflective surface angularly disposed with respect to the optical axis of said second camera and operable into optical alignment with the optical axis of said second camera and an associated one of said first, second, third or fourth input optical axes, thereby to provide an optical path involving only one mirror reflecting surface between one of said image sources and said second camera;

the planes of said reflective surfaces intersecting each other at a common vertical axis disposed between the optical axes of the first and second cameras.

2. The optical multiplexing system as described in claim 1, wherein said first and second cameras are color television cameras.

3. The optical multiplexing system of claim 2 wherein each of the eight optical paths has an identical length.

4. The optical multiplexing system described in claim 1, wherein said optical multiplexing device has a vertical axis disposed midway between the optical axes of said television cameras;

said first image source being disposed adjacent said first camera and on one side of said cameras so that said first input image axis is located in said horizontal plane at an acute angle of 60° from the optical axis of said first camera and at an obtuse angle of 120° from the optical axis of said second camera;

said second image source being disposed adjacent said first camera and on the other side of said cameras so that said second input image axis is located in said horizontal plane at an acute angle of 60° from the optical axis of said first camera and at an obtuse angle of 120° from the optical axis of said second camera;

said third image source being disposed adjacent said second camera and said second image source, on the other side of said cameras so that said third input image axis is located in said horizontal plane at acute angles of 60° from the optical axis of said second camera and from said second input image axis;

said fourth image source being disposed adjacent said first image source and said second camera, on said one side of said cameras so that said fourth input image axis is located in said horizontal plane at acute angles of 60° degrees from the optical axis of said second camera and from the first input image axis.

5. The optical multiplexing system described in claim 1, wherein said optical multiplexing device includes a housing which assumes the configuration of a hexahedron.

6. The optical multiplexing system described in claim 5, wherein the housing includes six discrete external sides;

one of said sides being disposed in perpendicular relationship to an associated one of said optical axes of said television cameras and the input image axes of said image sources.

7. Apparatus for selectively switching the optical input signals from four input devices to two output devices comprising means for locating a first, second, third and fourth reflection mirror in spaced apart relationship along one optical axis with the reflection surfaces of each of said mirrors facing in the same first direction;

means for locating a fifth, sixth, seventh and eighth reflection mirror in spaced apart relationship along a second optical axis parallel to and spaced apart from said one optical axis with the reflection surfaces of each of said last-named mirrors facing in the same second direction which is opposite to said first direction;

the reflection surfaces of said first and fifth mirrors being disposed in a first plane;

the reflection surfaces of said second and sixth mirrors being disposed in a second plane;

the reflection surfaces of said third and seventh mirrors being disposed in a third plane;

the reflection surfaces of said fourth and eighth mirrors being disposed in a fourth plane;

means for selectively directing input signals from any desired one of said four input devices for reflection from a respective one of said first, second, third or fourth mirrors along said first direction to one of said output devices and for selectivity directing input signals from any desired one of said four input devices for reflection from a respective one of said fifth, sixth, seventh or eighth mirrors along said second direction to the other of said output devices comprising means for locating said mirrors such that said first, second, third and fourth planes intersect one another at a common axis which is perpendicular to the plane containing said first and second optical axes.

8. An optical multiplexing device comprising a housing having the shape of a hexahedron, and providing a series of six equilateral sides;

a series of six windows formed in said housing at a predetermined vertical level;

one of said windows being located in each of said equilateral sides;

said windows including first and second camera windows located in opposite sides of said housing and first, second, third and fourth image input windows located in the remaining sides of said housing;

a first row of four mirrors supported for vertical movement in said housing;

each mirror of said first row having only a single reflective surface, each of said reflecting surfaces being substantially fully reflective and facing generally toward said first camera window with the plane of its reflective surface disposed in angular relationship thereto;

the reflective surfaces of the mirrors of said first row being arranged to individually and selectively provide four discrete optical paths from said first camera window to said respective first, second, third and fourth image input windows when any mirror of said first row is moved to said predetermined vertical level;

a second row of four mirrors supported for vertical movement in said housing;

each mirror of said second row having only a single reflective surface, each of said reflecting surfaces being substantially fully reflective and facing generally toward said second camera window with the plane of its reflective surface disposed in angular relationship thereto;

the reflective surfaces of the mirrors of said second row being arranged to individually and selectively provide four discrete optical paths from said second camera window to said respective first, second, third and fourth image input windows when any mirror of said second row is moved to said predetermined vertical level;

the planes of each of said reflecting surfaces substantially intersecting one another in a common axis disposed between the optical axes of said first and second camera windows.

9. The optical multiplexing device of claim 8 wherein said device provides eight optical paths having identical lengths.

10. An optical multiplexing system comprising a first television camera having an optical axis and an input target disposed thereon;

a second television camera having an optical axis and an input target disposed thereon;

said first and second cameras being relatively disposed in offset and generally facing relationship, the main optical axes of said cameras being disposed in parallel, spaced apart relationship;

first, second, third and fourth image sources each having an optical axis and clustered about said first and second cameras;

said first and second image sources located on opposite sides of and adjacent to said first camera;

said third and fourth image sources located on opposite sides of and adjacent to said second camera;

first, second, third and fourth mirrors disposed successively at spaced apart distances from the input target of said first camera along the input optical axis thereof;

said first, second, third and fourth mirrors each having only a single reflective surface exposed toward the input target of said first camera;

fifth, sixth, seventh and eighth mirrors disposed successively at spaced apart distances from the input target of said second camera along the input optical axis thereof;

said fifth, sixth, seventh and eighth mirrors each having only a single reflective surface exposed toward the input target of said second camera;

each of said reflective surfaces being substantially fully reflective;

the reflective surfaces of said first and fifth mirrors being disposed in a first plane;

the reflective surfaces of said second mirror and said sixth mirror being disposed in a second plane;

the reflective surfaces of said third mirror and said seventh mirror being disposed in a third plane;

the reflective surfaces of said fourth mirror and said eighth mirror being disposed in a fourth plane;

said first, second, third and fourth planes intersecting each other at a common vertical axis disposed between the optical axes of the first and second cameras;

the reflective surfaces of said first, second, third and fourth mirrors being arranged respectively to provide discrete optical paths to said first camera along the input optical axis thereof from said fourth, first, second and third image sources;

the reflective surfaces of said fifth, sixth, seventh and eighth mirrors being arranged respectively to provide discrete optical paths to said second camera along the input optical axis thereof from said second, third, fourth and first image sources;

whereby any image source of said system has a discrete optical path from its optical axis and one of two associated mirrors to any one of said first and second cameras, and while said one image source is being actively assigned to said one of said cameras, any of said other three image sources has a discrete optical path from its optical axis and one of two associated mirrors to the other one of said cameras.

11. The optical multiplexing system described in claim 10, wherein said first and second cameras are color television cameras;

said first through eighth mirrors are each first surface mirrors which provide a single image reversal off their first surface;

and each of said first, second, third and fourth image sources comprises a film projector.

* * * * *

UNITED STATES PATENT OFFICE
CERTIFICATE OF CORRECTION

Patent No. 3,662,106 Dated May 9, 1972

Inventor(s) Dale F. Buller and Douglas W. Rohrs

It is certified that error appears in the above-identified patent and that said Letters Patent are hereby corrected as shown below:

Change printed issue date on the subject patent from May 9, 1917 to May 9, 1972.

Signed and sealed this 19th day of March 1974.

(SEAL)
Attest:

EDWARD M.FLETCHER,JR.
Attesting Officer

C. MARSHALL DANN
Commissioner of Patents